(12) United States Patent  
Inagawa et al.

(10) Patent No.: US 6,367,729 B1  
(45) Date of Patent: Apr. 9, 2002

(54) SEAT BELT RETRACTOR

(75) Inventors: Yasuhiro Inagawa, Suita; Masao Nishikawa, Settsu, both of (JP)

(73) Assignee: Ashimori Industry Co., Ltd., Osaka-fu (JP)

( * ) Notice: Subject to any disclaimer, the term of this patent is extended or adjusted under 35 U.S.C. 154(b) by 0 days.

(21) Appl. No.: 09/674,069

(22) PCT Filed: Apr. 26, 2000

(86) PCT No.: PCT/JP00/02783

§ 371 Date: Feb. 1, 2001

§ 102(e) Date: Feb. 1, 2001

(87) PCT Pub. No.: WO00/64711

PCT Pub. Date: Nov. 2, 2000

(30) Foreign Application Priority Data

Apr. 27, 1999  (JP) ............................................. 11-119994

(51) Int. Cl.$^7$ ................................................ B60R 22/28
(52) U.S. Cl. .................................................. 242/379.1
(58) Field of Search ....................... 242/379.1; 280/805, 280/806; 297/478, 470, 471, 472

(56) References Cited

U.S. PATENT DOCUMENTS 6,267,314 B1 * 7/2001 Singer et al. ............ 242/379.1

FOREIGN PATENT DOCUMENTS

| JP | 7-19025 | 4/1995 |
| JP | 10-94620 | 4/1998 |
| JP | 10-310026 | 11/1998 |

* cited by examiner

Primary Examiner—John M. Jillions  
(74) Attorney, Agent, or Firm—Jordan and Hamburg LLP

(57) ABSTRACT

A seat belt retractor is provided in which a torsion bar of an energy absorption mechanism and a ratchet wheel of an emergency locking mechanism can be easily combined in a constant angular phase without requiring any special precise working, which always stably operates without causing any problem such as that the emergency locking mechanism is out of synchronization, and in which an energy can be effectively absorbed without accompanying any time delay. As means for attaining the object, a coupling portion 5b of a torsion bar 5 with respect to a ratchet wheel 41, and an insertion hole 41c of the ratchet wheel 41 into which the coupling portion 5b is to be fitted and squeezed are made to have a polygonal section shape in which concaves and convexes are formed at a predetermined interval in a circumference direction, and a rib-like projection 8 for biasing the torsion bar 5 in the insertion hole 41c in the rotating direction in drawing out of the webbing to cause respective concaves and convexes to come mutually in press contact with each other in the direction is formed on an inner face of the insertion hole 41c. Thus, the torsion bar 5 and the ratchet wheel 41 are always combined in a constant angular phase, and any time delay cannot be caused in twist deformation of the torsion bar 5.

4 Claims, 8 Drawing Sheets

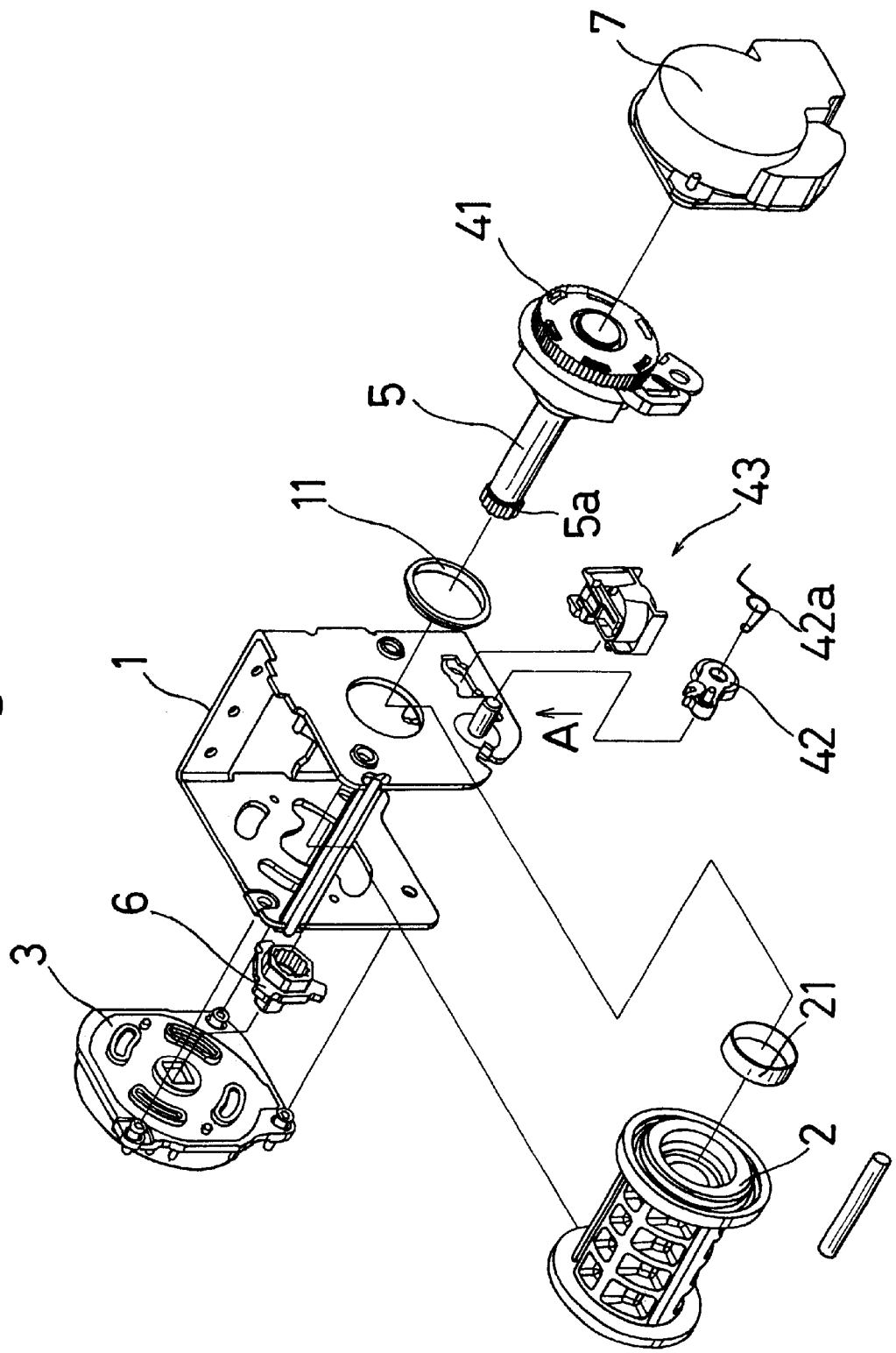

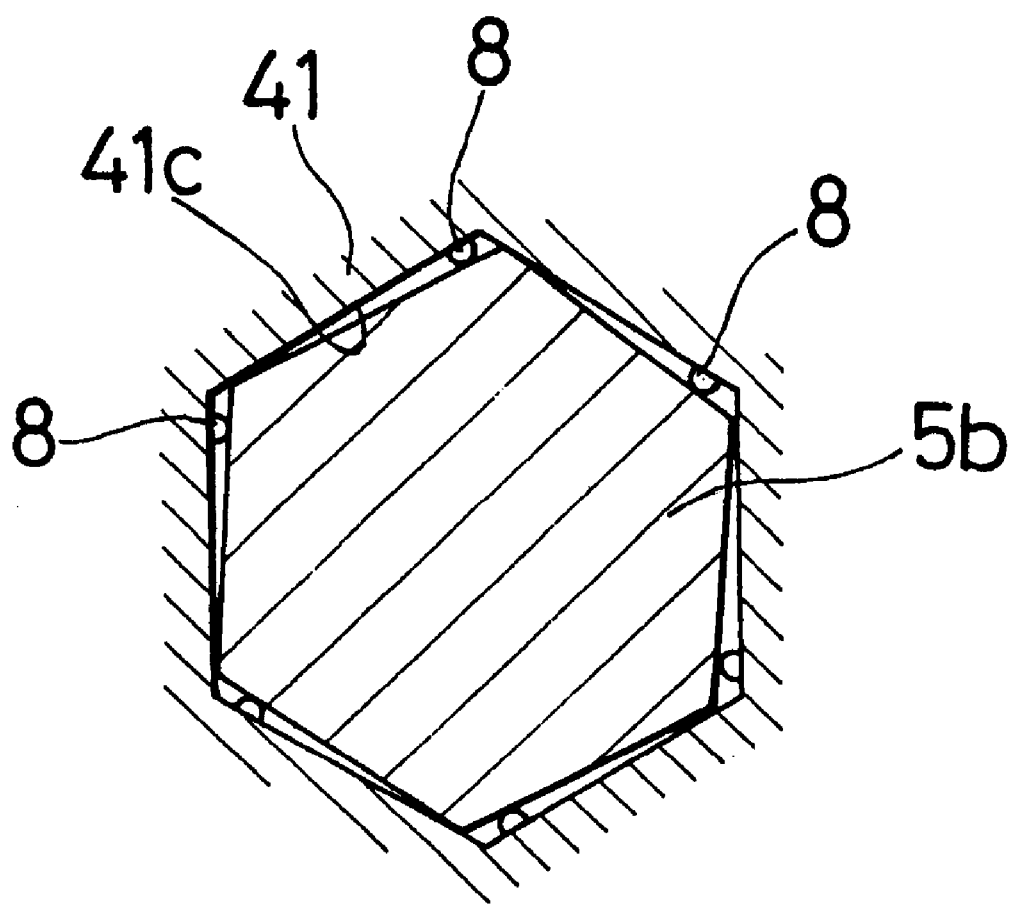

SEAT BELT RETRACTOR

TECHNICAL FIELD

The invention relates to a seat belt retractor provided with an emergency locking mechanism for constraining an occupant by preventing a webbing from being drawn out in a crash of a vehicle or on other occasions, and also provided with an energy absorption mechanism for absorbing an impact load acting between the occupant and the webbing, so as to protect the occupant.

BACKGROUND ART

A seat belt retractor which, in a non-use condition, takes up a webbing of a seat belt apparatus attached to a vehicle body or the like and for holding an occupant in the seat is generally provided with inertia sensing means for, in a crash of a vehicle, a rapid acceleration or deceleration of the vehicle body, or the like, detecting this, and also provided with an emergency locking mechanism for, in response to the detection, preventing the webbing from rewinding, so that an occupant can be safely constrained in the seat by the webbing in an emergency such as a crash of a vehicle.

In the case where the emergency locking mechanism operates in a crash of a vehicle, a rapid deceleration of the vehicle body, or the like, if the webbing is perfectly set in a locked condition, a large impact load acts between an occupant and the webbing. Conventionally, therefore, the following seat belt retractor is already practically used. The seat belt retractor is provided with an energy absorption mechanism which, in the case where an impact load acting on the webbing exceeds a definite value, absorbs the impact load while the webbing is drawn out at a certain degree.

As a seat belt retractor provided with such an energy absorption mechanism, known is a seat belt retractor having a configuration in which a torsion bar made of soft steel or the like is interposed between a spool for taking up a webbing and an emergency locking mechanism for blocking the rotation of the spool. Specifically, in a seat belt retractor provided with such a kind of energy absorption mechanism, an emergency locking mechanism adopts a configuration provided with a ratchet wheel which rotates together with the spool, and a pawl which locks the spool via the ratchet wheel with meshing with the ratchet wheel in response to the detection of a crash of a vehicle or the like by inertia sensing means. In addition, a torsion bar is interposed between the ratchet wheel and the spool. One end of the torsion bar is coupled to the spool and the other end is coupled to the ratchet wheel. When a force drawing the webbing exceeds a certain limit, the torsion bar is subjected to twist deformation between the spool around which the webbing is wound and the ratchet wheel which is in a locked condition by the meshing with the pawl, so that the spool rotates by a predetermined amount with respect to the ratchet wheel, and the impact load acting on the webbing is absorbed (for example, see Japanese Patent Publication (Kokai) No. HEI10-250529).

In the above-mentioned seat belt retractor provided with the energy absorption mechanism mainly including the torsion bar, however, in addition to the ratchet wheel, an inertia sensing device (a locking arm, a locking arm base, or the like) which rotates in synchronization with the torsion bar and which is synchronized so that the ratchet wheel and the pawl precisely mesh with each other is coupled to the torsion bar.

In a seat belt retractor in which an energy absorption mechanism is not added, when a spindle of a spool corresponding to the torsion bar and a ratchet wheel of an emergency locking mechanism are integrally formed, precise synchronization can be relatively easily realized by a combination in which the angular phase of the spindle with respect to other members is constant. In the torsion bar of the energy absorption mechanism, soft steel which is easily subjected to twist deformation is used. On the other hand, in the ratchet wheel of the emergency locking mechanism, hard steel is used because the ratchet wheel is required to withstand an extremely large load at the time of lock due to meshing with the pawl. For this reason, they cannot be integrally formed. Accordingly, the torsion bar and the ratchet wheel are formed as individual members and the following structure is adopted. As disclosed in above-described Japanese Patent Publication (Kokai) No. HEI10-250592, for example, a coupling portion of a hexagonal shape is formed at one end of the torsion bar, and a hexagonal insertion hole for fitting the coupling portion of the torsion bar is formed in the ratchet wheel. The coupling portion of the torsion bar is fitted into the insertion hole, thereby coupling them with each other.

However, in order to enable the coupling portion of the torsion bar to be fitted into the inserting hole of the ratchet wheel, a gap of a certain size or more is naturally required between them. For this reason, at the time of the coupling of these members, there inevitably occurs a little combination error in a circumference direction. As a result, as the number of incorporated components is larger, it becomes more difficult to precisely maintain the synchronization of the components in accordance with the design. This results in a problem that the emergency locking mechanism is out of synchronization, so that the winding of the webbing or the drawing disabled condition (lock-up phenomenon) is caused.

In the above-identified Japanese Patent Publication (Kokai) No. HEI10-250592, a technique for applying a previous twist to the torsion bar to variously change an energy absorption load by using only one kind of torsion bar is disclosed. The publication also discloses that, for the purpose of identifying the previous twist angle, a cutout or a projection is disposed in one position in a circumference direction on surfaces of coupling portions at both ends of the torsion bar made of soft steel to the spool and the ratchet wheel. The publication describes that, in the case where the projection is disposed, at the time of insertion into the insertion hole of the ratchet wheel, the projection is broken, so that rattling between the insertion hole and the coupling portion of the torsion bar can be eliminated.

The projection formed in one position in the circumference direction on the side of the torsion bar made of soft steel has an effect that, at the insertion into the insertion hole, the projection is appropriately deformed, so as to eliminate a gap with the insertion hole, and rattling therebetween is effectively eliminated in a condition in which any force is not applied. When a twisting moment acts on the torsion bar, however, the projection is easily deformed further because the projection is disposed on the side of the torsion bar made of soft material, and a relative displacement is easily caused as a result of that the projection is scraped by the coupling portion to the ratchet wheel. When such a twisting moment repetitively acts, rattling eventually occurs between them, and there arises a possibility that the synchronization of the emergency locking mechanism cannot be attained. Even if such a projection is disposed on an outer circumference of the torsion bar, it is impossible to eliminate a combination error in an angular phase between the torsion bar and the ratchet wheel.

The invention has been conducted in view of the above-mentioned circumstances. It is an object of the invention to provide a seat belt retractor in which a torsion bar of an energy absorption mechanism and a ratchet wheel of an emergency locking mechanism can be easily combined with good reproducibility and in a constant angular phase without requiring any special precise working, which stably and surely operates without causing the emergency locking mechanism to be out of synchronization, and in which an energy can be effectively absorbed without accompanying any time delay.

DISCLOSURE OF INVENTION

Specifically, in order to attain the above-mentioned object, the seat belt retractor of the invention is a seat belt retractor in which the seat belt retractor comprises: a spool for winding a webbing; and an emergency locking mechanism including: a ratchet wheel which rotates together with the spool; and a pawl which meshes with the ratchet wheel in response to emergency detection by inertia sensing means, thereby setting the spool into a locked condition via the ratchet wheel, and a torsion bar is disposed between the spool and the ratchet wheel, one end of the torsion bar being coupled to the spool, another end of the torsion bar being coupled to the ratchet wheel, the torsion bar being subjected to twist deformation to absorb an impact when a force in a drawing direction acts on the webbing in an operating condition of the emergency locking mechanism, and characterized in that a coupling portion of the torsion bar with respect to the ratchet wheel is formed into a polygonal shape, a polygonal insertion hole into which the polygonal coupling portion is to be fitted is formed in the ratchet, and a rib-like projection is formed on an inner face of the polygonal insertion hole in an axial direction of the torsion bar, the rib-like projection biasing, when the webbing is drawn, the torsion bar in the insertion hole in a direction along which the torsion bar rotates, to cause respective faces to be in press contact with each other in the direction.

In the invention, as the polygonal shape of the coupling portion of the torsion bar with respect to the ratchet wheel, a polygonal shape such as a hexagon or an octagon, or another polygonal shape in which concaves and convexes are formed at a predetermined interval in a circumference direction can be adopted. As a more specific shape in such a case, for example, a star shape, a spline tooth shape, a serration tooth shape, and the like can be employed.

In the invention, it is preferred to adopt a configuration in which the rib-like projection is formed in at least three positions on the inner face of the polygonal insertion hole at predetermined intervals in the circumference direction.

The rib-like projection in the invention is desirably formed from a position which is distant away from an open end of the polygonal insertion hole on a torsion bar insertion side by a predetermined distance, to an inner side.

In the invention, each of the coupling portion of the torsion bar with respect to the ratchet wheel, and the insertion hole of the ratchet wheel into which the coupling portion is to be fitted has a polygonal shape, and a rib for biasing the torsion bar in a predetermined direction in the insertion hole so that the respective faces closely come into contact with each other in the predetermined direction is formed in the insertion hole of the ratchet wheel, thereby enabling the torsion bar and the ratchet wheel to, when the coupling portion of the torsion bar is fitted into the insertion hole of the ratchet wheel, be combined so as to always attain a constant angular phase between torsion bar and the ratchet wheel. The rib-like projection is disposed on the side of the insertion hole of the ratchet wheel of a harder material, so that the rib-like projection is not broken at the insertion of the torsion bar, and the projection is engaged so as to scrape the side of the coupling portion of the torsion bar. Thus, the faces on the opposite sides strongly come in press contact with each other, so that the torsion bar and the ratchet wheel are always combined in a constant angular phase.

The direction of biasing of the torsion bar in the insertion hole is set to the direction in which the torsion bar rotates when the webbing is drawn out. Therefore, a face of the coupling portion of the torsion bar is initially in press contact with a face of the insertion hole of the ratchet wheel in the rotation direction. When an impact load acts on the webbing in a crash of a vehicle or the like and a torque in a direction of drawing out the webbing acts on the torsion bar via the spool, consequently, a relative rotation between the torsion bar and the ratchet wheel is not caused. Thus, twist deformation is immediately caused without producing any time delay, so that an energy can be effectively absorbed.

According to the invention, the coupling portion of the torsion bar and the insertion hole of the ratchet wheel have a polygonal shape in which concaves and convexes are formed at a predetermined interval in the circumference direction. When the coupling portion is biased in the insertion hole in the above-mentioned direction, therefore, the concaves and convexes of the coupling portion and the insertion hole are in press contact with each other in a mutual face abutting manner. Accordingly, the effect for preventing the relative rotation of the torsion bar and the ratchet wheel from occurring can be more surely attained.

In addition, when the configuration of the invention in which the rib-like projection formed in the insertion hole of the ratchet wheel is formed in at least three positions at predetermined intervals in the circumference direction is employed, the torsion bar is not partially biased in the insertion hole, but is always precisely biased in the above-mentioned direction, so that the respective faces can be surely and closely in contact with each other in the direction.

According to the invention, the above-mentioned rib-like projection is not formed in the vicinity of the open end on the torsion bar inserting side of the insertion hole of the ratchet wheel, but formed in a position distant away from the open end by a predetermined distance. With this configuration, when the coupling portion of the torsion bar is being inserted, it is possible to insert the coupling portion of the torsion bar into the insertion hole in a condition where they are easily and surely positioned, because a certain degree of gap exists between the insertion hole and the coupling portion of the torsion bar in an initial stage of the insertion. Thus, it is advantageous that the combining work can be facilitated.

BRIEF DESCRIPTION OF DRAWINGS

FIG. 2 is an exploded perspective view of the embodiment of the invention.

FIG. 3 is a detailed explanation view of a torsion bar 5 in the embodiment of the invention, in which

FIG. 9 is an explanation view of shapes of a coupling portion 5b of a torsion bar 5 and an insertion hole 41c of a ratchet wheel 41 and forming positions of rib-like projections 8 in a further embodiment of the invention.

BEST MODE FOR CARRYING OUT THE INVENTION

Hereinafter, preferred embodiments of the invention will be described with reference to the accompanying drawings.

Figure 1:
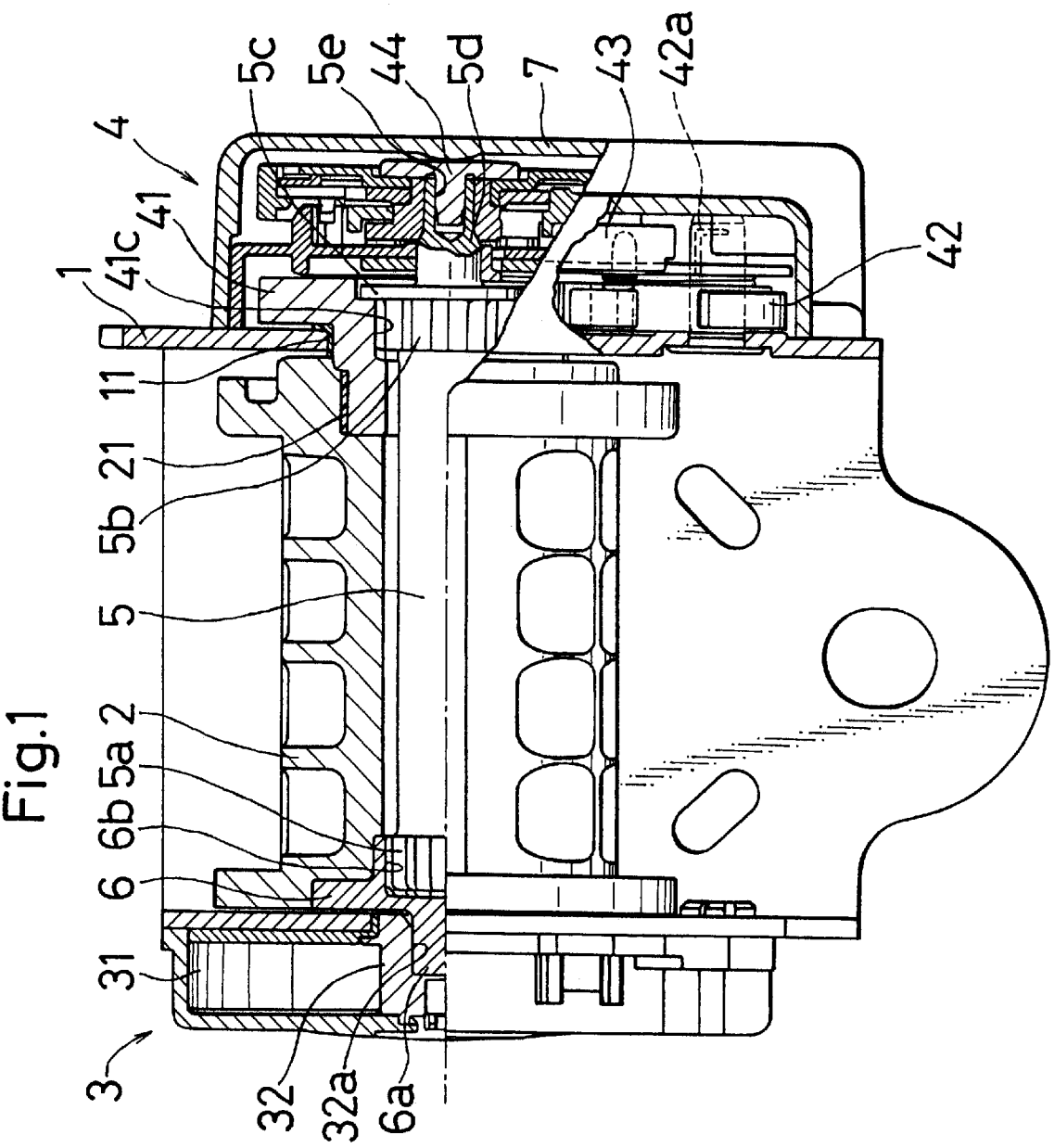
FIG. 1 is a partial longitudinal section view of an embodiment of the invention in which the vicinity of a pawl 42 is shown as a view indicated by an arrow A in FIG. 2 in a condition where only a cover 7 is cut away.

FIG. 1 is a partial longitudinal section view of an embodiment of the invention, and FIG. 2 is an exploded perspective view of the embodiment. In FIG. 1, a pawl 42 is shown as viewed as indicated by an arrow A in FIG. 2 in a condition where only a cover 7 is shown partially cut away, a frame 1 which is to be fixed to a vehicle body, and a spool 2 around which a webbing is to be wound is rotatably disposed. On one end side of the frame 1, a winding device 3 for rotatively energizing the spool 2 in a taking-up direction of the webbing is attached. On the other end side, an emergency locking mechanism 4 which will be described later is attached.

The spool 2 has a drum-like shape having a hollow which elongates in the axial direction, in the center portion thereof. In the hollow, a torsion bar 5 made of soft steel is disposed coaxially with the center shaft of the spool 2. As will be described later, in the torsion bar 5, coupling portions 5a and 5b each having a star section shape are formed in both end portions, respectively. One of the coupling portions or the coupling portion 5a is coupled to the spool 2 in a mutual rotation disabled manner, and the other coupling portion 5b is coupled to the ratchet wheel 41 of the emergency locking mechanism 4, similarly in the mutual rotation disabled manner.

To one end of the spool 2, a coupling member 6 having an outer circumference of a different shape is attached in a mutual rotation disabled manner. On an end face on the outer side of the coupling member 6, a projection 6a having a rectangular section shape is formed in a condition where the coupling member is attached to the spool 2. In addition, in an end face on the opposite side, an insertion hole 6b for coupling the torsion bar is formed. The coupling portion 5a on one end side of the torsion bar 5 is fitted into the insertion hole 6b, so that the torsion bar 5 and the spool 2 are integrally coupled in a mutual rotation disabled manner via the coupling member 6. The projection 6a having a rectangular section shape and formed on the coupling member 6 is engaged with the winding device 3, and the rotatively energizing force of the spool 2 by the above-mentioned winding device 3 is transmitted via the coupling member 6. Specifically, the winding device 3 is mainly configured by a spiral spring 31, and a rotor 32 which is disposed in the center of the spiral spring 31, and which is rotatively energized by the elastic force of the helical spring 31. The projection 6a having the rectangular section shape of the coupling member 6 is inserted into a hole 32a having a rectangular section shape and formed in the center of the rotor 32. The rotatively energizing force by the spiral spring 31 is transmitted to the spool 2 via the rotor 32 and the coupling member 6.

The emergency lock member 4 is mainly configured by: the ratchet wheel 41 made of hard steel and rotatably supported with respect to the frame 1 via a bushing 11; and the pawl 42 which is always energized in a direction removing from the ratchet wheel 41 by the energizing force of a spring 42a, and which meshes with the ratchet wheel 41 in response to a detection result such as a crash of a vehicle by an inertia sensing device 43 including an acceleration sensor, an inclination sensor, etc of the vehicle body. The ratchet wheel 41 of the emergency locking mechanism 4 is coupled to the coupling portion 5b on the other end side of the torsion bar 5 in a mutual rotation disabled manner, as described below. In addition, on an outer circumference face on one end side, the ratchet wheel supports the spool 2 via a bushing 21. The whole of the emergency locking mechanism 4 is covered with a cover 7. In the cover 7, a cap 44 for rotatably supporting an end of the coupling portion 5b of the torsion bar 5 is disposed.

Figure 3A:
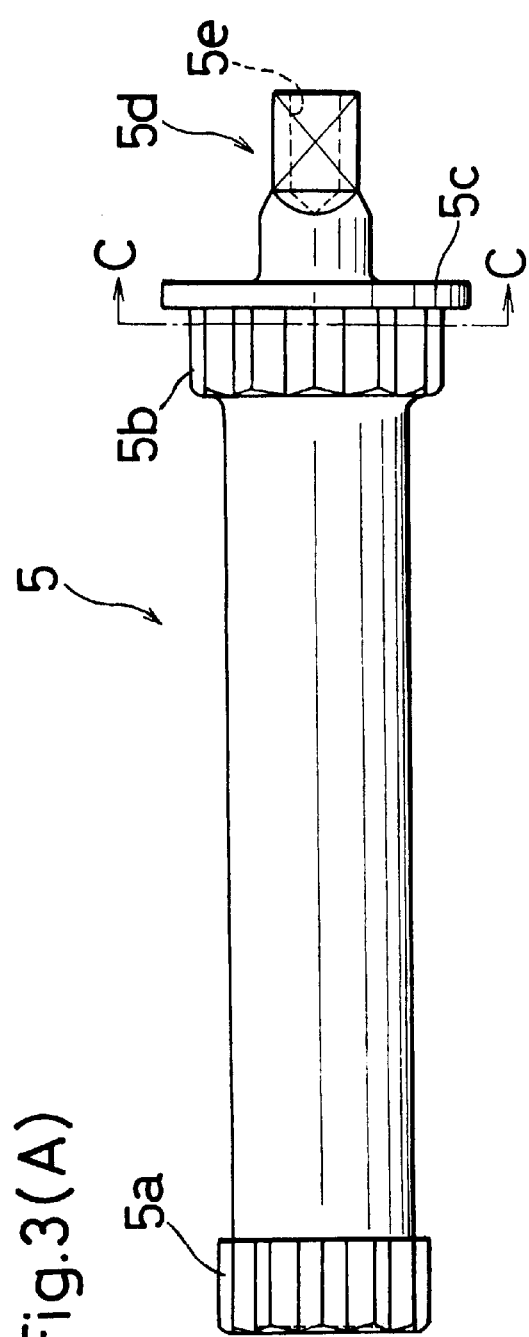
FIG. 3(A) is a front view.
Figure 3B:
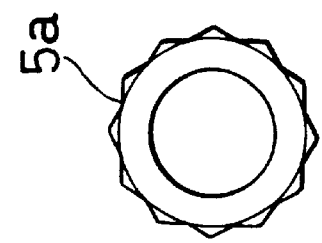
FIG. 3(B) is a left side view.
Figure 3C:
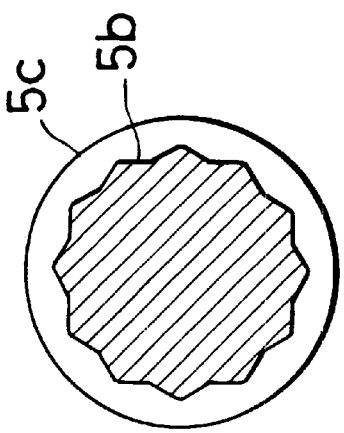
FIG. 3(C) is a section view taken along a line C—C of FIG. 3(A).
Figure 4A:
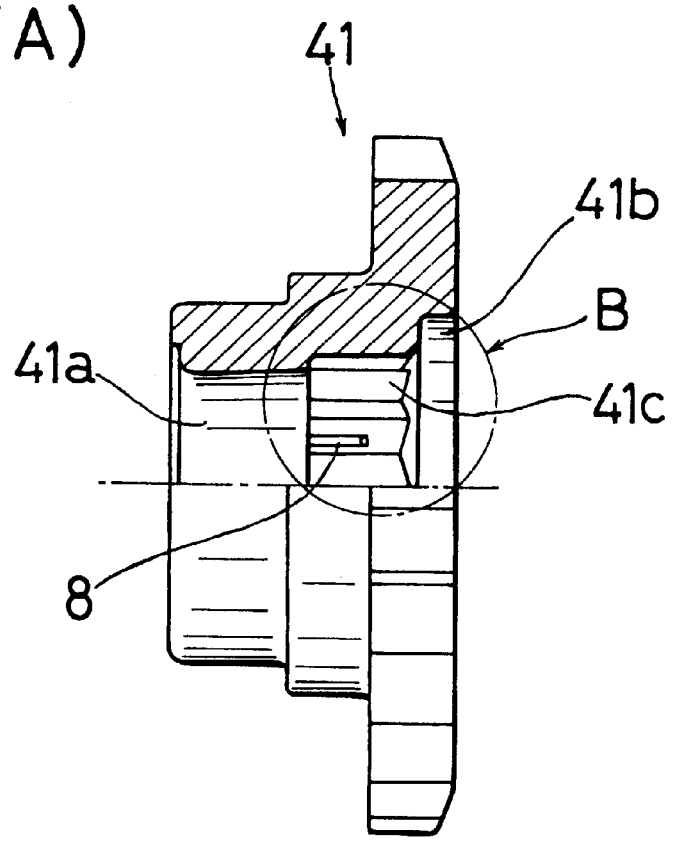
FIG. 4(A) is a partial longitudinal section view of a ratchet wheel 41 in the embodiment of the invention.
Figure 4B:
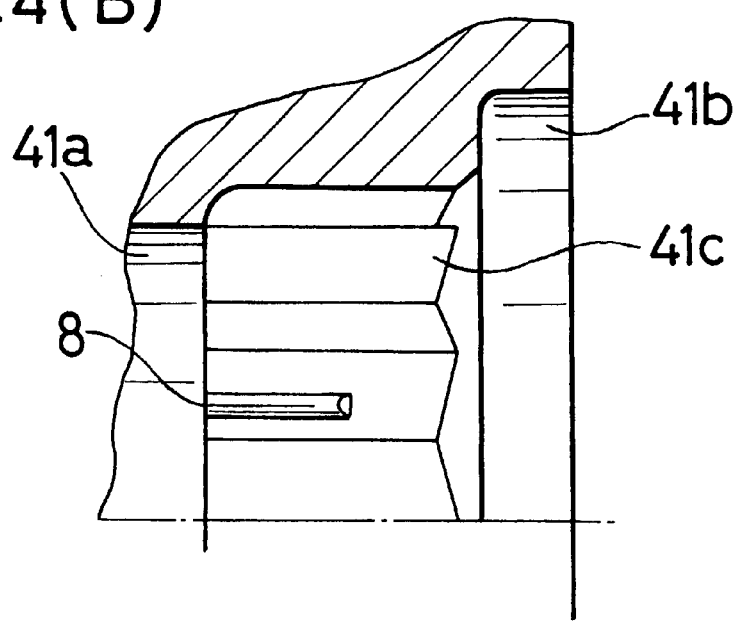
FIG. 4(B) is an enlarged view (B) of a portion B in FIG. 4(A).
Figure 5A:
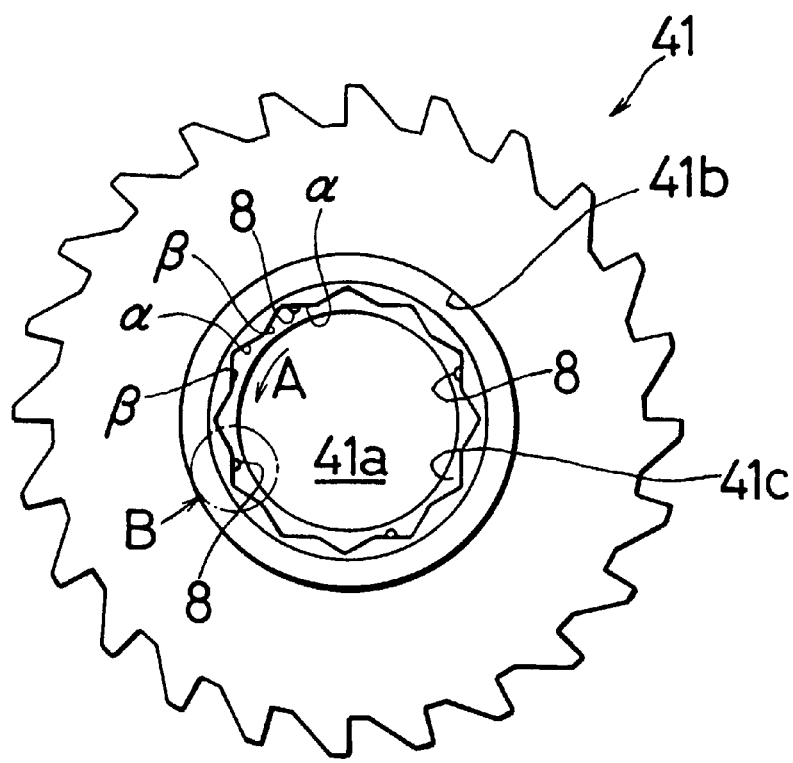
FIG. 5(A) is a left side view of FIG. 4(A)
Figure 5B:
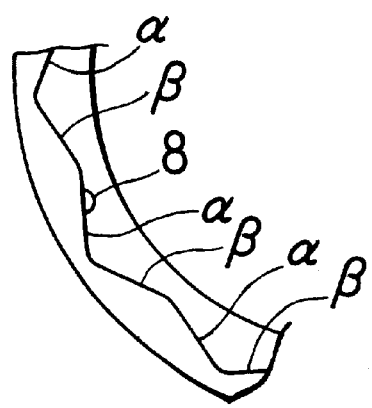
FIG. 5(B) is an enlarged view of the portion B.

FIG. 3 is a detailed explanation view of the torsion bar 5. FIG. 3(A) is a front view, FIG. 3(B) is a left side view thereof, and FIG. 3(C) is a section view taken along a line C—C in FIG. 3(A). FIGS. 4 and 5 are detailed explanation views of the ratchet wheel 41. FIG. 4(A) is a partial longitudinal section view, and FIG. 4(B) is an enlarged view of a portion B of the figure. FIG. 5(A) is a left side view of FIG. 4(A), and FIG. 5(B) is an enlarged view of the portion B.

The coupling portions 5a and 5b disposed in both end portions of the torsion bar 5 have star-like section shapes in each of which concave portions and convex portions of isosceles triangles are regularly and repetitively formed at pitches of 30° in a circumference direction. On an end side of the coupling portion 5b for the ratchet wheel 41, a protruding shaft 5d is formed via a flange portion 5c. In an end face of the protruding shaft 5d, a hole 5e into which the above-mentioned cap 44 is to be fitted is formed.

In the ratchet wheel 41, a through hole 41a is formed on the center shaft thereof. On one end side of the through hole 41a, a larger diameter portion 41b into which the flange portion 5c of the torsion bar 5 is to be fitted in the combined condition is formed. A portion which is adjacent to the larger diameter portion 41b is formed so as to have a star-like section shape which is similar to the star-like section shape of the coupling portion 5b of the torsion bar 5, so that an insertion hole 41c for coupling to the torsion bar 5 is configured. Accordingly, as for the torsion bar 5, one end portion in the coupling portion 5a is coupled to the spool 2 via the above-described coupling member 6, the other end portion in the coupling portion 5b is coupled to the ratchet wheel 41, and the end of the other end portion is rotatably supported by the supporting cap 44. Also the torsion bar coupling insertion hole 6b of the coupling member 6 to which the coupling portion 5a of one end portion of the torsion bar 5 is to be coupled has a star-like section shape which is similar to the star-like section shape of the coupling portion 5a.

An inner face size of the star-like section shape of the insertion hole 41b of the ratchet wheel 41 is formed so as to be slightly larger than an outer face size of the coupling portion 5b because a gap for fitting the coupling portion 5b of the torsion bar is required. On an inner face of the insertion hole 41b, rib-like projections 8 are formed four positions in total in the axial direction of the torsion bar 5 on the surface of a slope α which is one of two kinds of facing slopes α and β constituting a concave portion of an isosceles triangle formed at a predetermined interval and which is mutually spaced by 90° in the circumference direction. The slope α on which the rib-like projection 8 is formed is a slope of the above-mentioned two kinds of facing slopes on the side in opposition to the rotating direction of the torsion bar 5 in drawing out of the webbing (indicated by an arrow A in FIG. 5(A)). Each of the rib-like projections 8 elongates in the axial direction from an end portion on the side opposite to the larger diameter portion 41*b* of the insertion hole 41*c*, and terminates in a position separated by a predetermined distance from the end portion on the side of the larger diameter portion 41*b*. In other words, the rib-like projections 8 on the inner face of the insertion hole 41*c* are not formed in the predetermined distance from the end portion on the side of the larger diameter portion 41*b*.

Figure 6:
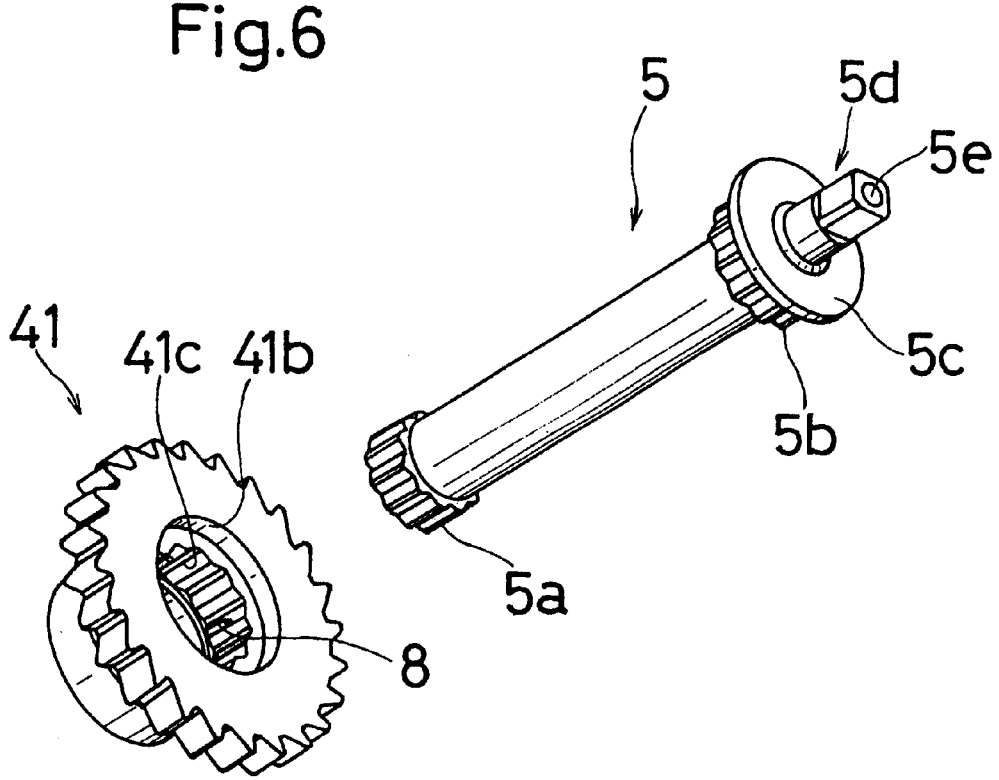
FIG. 6 is a perspective view for explaining a work of combining the torsion bar 5 and the ratchet wheel 41 in the embodiment of the invention.

In order to combine and mutually couple the ratchet wheel 41 and the torsion bar 5, as shown in a perspective view of FIG. 6, the coupling portion 5*a* on one end side of the torsion bar 5 is inserted into the insertion hole 41*a* of the ratchet wheel 41 from the side of the larger diameter portion 41*b*, and the coupling portion 5*b* on the other end side is fitted and squeezed into the insertion hole 41*c*. In the combining work, the coupling portion 5*b* is inserted into the insertion hole 41*c* from the side of the larger diameter portion 41*b*. In an initial stage of the combining work in which the coupling portion 5*b* is started to be inserted into the insertion hole 41*c*, the coupling portion 5*b* passes through a region in which the rib-like projections 8 are not formed. Thus, a gap is formed between the insertion hole 41*c* and the coupling portion 5*b*, so that the insertion can be easily performed.

Figure 7:
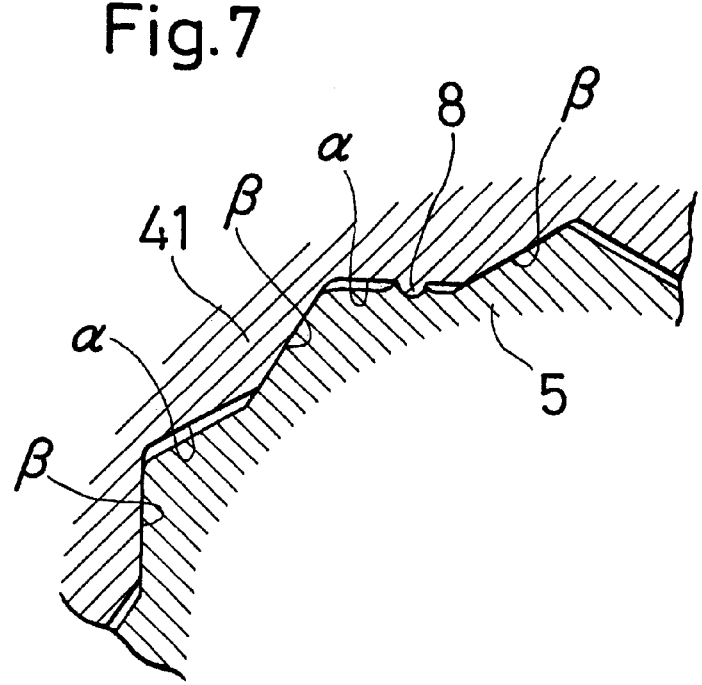
FIG. 7 is a section view of main portions in a combined condition of the torsion bar 5 and the ratchet wheel 41 in the embodiment of the invention.

When the leading end of the coupling portion 5*b* then reaches the region in which the rib-like projections 8 are formed, the respective rib-like projections 8 on the side of the ratchet wheel 41 made of hard steel are not broken, and the coupling portion 5*b* of the torsion bar 5 made of soft steel is deformed so as to be scraped out by the rib-like projections 8. As shown in a section view of main portions of FIG. 7, the coupling portion 5*b* is always biased toward the side opposite to the rib-like projections 8 in the insertion hole 41*c*. Since the star-like section shape of the coupling portion 5*b* and the star-like section shape of the insertion hole 41*c* are similar, this biasing causes the slope β on which the rib-like projections 8 are not formed, to be in strong press contact with a slope of the coupling portion 5*b* opposite thereto, among the above-mentioned two kinds of slopes α and β of the insertion hole 41*c*.

In the embodiment, as described above, the rib-like projections 8 are formed on the slope α on the side in opposition to the rotating direction of the torsion bar 5 in drawing out of the webbing. As a result, due to the existence of the rib-like projections 8, the torsion bar 5 is always biased in the insertion hole 41*c* in the rotating direction in drawing out of the webbing, and the respective concaves and convexes are in press contact with each other in the direction. Accordingly, the torsion bar 5 and the ratchet wheel 41 are always combined in a constant angular phase in the circumference direction, so that it is possible to prevent a combination error in the circumference direction from occurring.

According to the embodiment of the invention, when the inertia sensing device 43 detects a crash of a vehicle or the like and the emergency locking mechanism 4 operates, that is, when the pawl 42 meshes with the ratchet wheel 41 and the rotation is blocked, even if a large force in the direction of drawing out the webbing acts, the coupling portion 5*b* and the insertion hole 41*c* cannot relatively rotate because the coupling portion 5*b* of the torsion bar 5 is previously and strongly in press contact with the concaves and convexes of the insertion hole 41*c* of the ratchet wheel 41 in the rotating direction in drawing out of the webbing. When an impact load by which twist deformation occurs in the torsion bar 5 acts on the webbing, therefore, the torsion bar 5 immediately starts the twist deformation without accompanying any time delay, and the impact load can be effectively absorbed.

A point to which the attention is to be especially paid in the above-described embodiment is that the rib-like projections 8 are formed in a plurality of positions in the insertion hole 41*c* at regular intervals in the circumference direction. Accordingly, when the torsion bar 5 and the ratchet wheel 41 are combined, the coupling portion 5*b* of the torsion bar 5 is not locally biased in the insertion hole 41*c*, but is always biased in the circumference direction, so that an error in combination phase angle between the torsion bar 5 and the ratchet wheel 41 can be prevented from occurring. The number of the rib-like projections 8 is not limited to four as in the above-described embodiment. Alternatively, if three or more projections are disposed at equal intervals in the circumference direction, the same effects as those described above can be attained.

The rib-like projections 8 are not formed in a region of a predetermined distance from the end of the insertion side of the coupling portion 5*b* of the torsion bar 5. Thus, at the start of the insertion of the coupling portion 5*b* into the insertion hole 41*c*, a gap exists between them, so that the insertion can be smoothly performed, and the work can be extremely easily performed.

Figure 8:
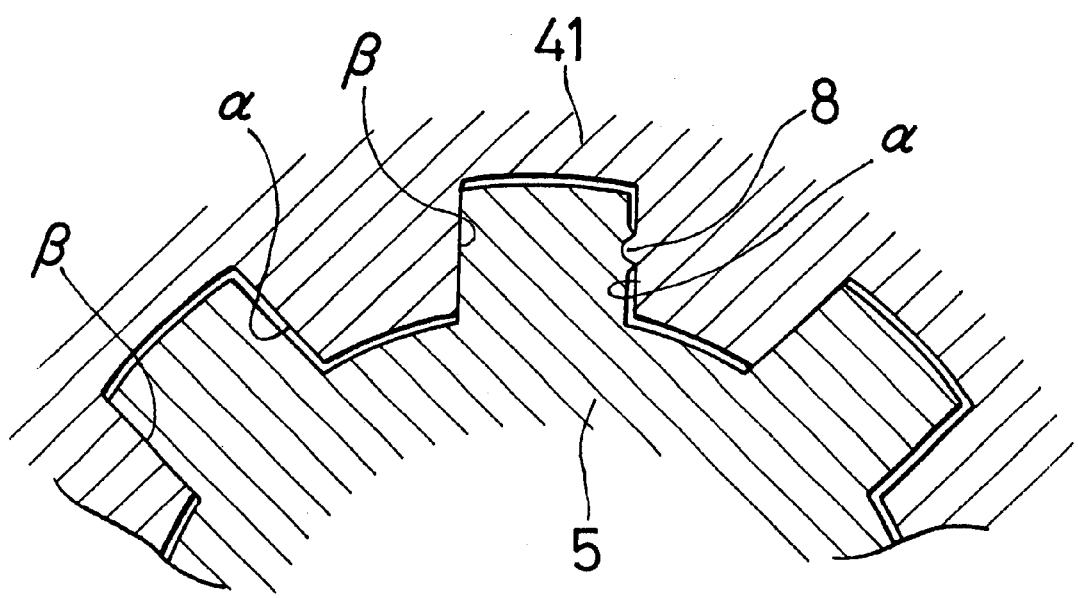
FIG. 8 is a section view of main portions in a combined condition of a torsion bar 5 and a ratchet wheel 41 in another embodiment of the invention.

In the above-described embodiments, the coupling portion 5*b* of the torsion bar 5 and the insertion hole 41*c* of the ratchet wheel 41 have a star-like section shape. The invention is not limited to this. Alternatively, any arbitrary polygonal shape can be adopted. As other examples of polygons in which concaves and convexes are formed at a predetermined interval in the circumference direction, a rectangular spline shape as shown in, for example, a section view of the combined condition of FIG. 8, or a serration shape can be adopted. Alternatively, a polygonal shape of, for example, a hexagon, or an octagon which does not include such concaves and convexes formed at a predetermined interval may be used. In such a case, when the rib-like projections are formed in the vicinity of one end portion of a side of the polygonal shape, as exemplarily shown in FIG. 9 the coupling portion 5*b* of the torsion bar 5 can be always and surely biased in a required direction in the insertion hole 41*c* of the ratchet wheel 41.

As for the configuration of portions other than the coupling portion 5*b* of the torsion bar 5 and the insertion hole 41*c* of the ratchet wheel 41, the invention is not limited to the configuration employed in the aboved-described embodiments. It is a matter of course that any other known configaration can be adopted.

As described above, according to the invention, the section shape of a coupling portion formed in an end portion of a torsion bar and insertion hole of a ratchet wheel of an emergency locking mechanism into which the coupling portion is to be fitted are made to be polygonal. On an inner face of the insertion hole of the ratchet wheel, rib-like projections for biasing the torsion bar in a rotating direction in drawing out of the webbing to cause respective faces to be in press contact with each other in the direction are formed in the axial direction of the torsion bar. Thus, the torsion bar and the ratchet wheel are always combined in a constant angular phase, and any combination error between them in the circumference direction cannot occur. Therefore, a problem that the emergency locking mechanism is out of synchronization is not produced.

In addition, the rib-like projections are formed in the insertion hole of the ratchet wheel made of a relatively harder material, so that, when the coupling portion of the torsion bar made of a soft material such as soft steel is fitted into the insertion hole, the rib-like projections are not broken. The torsion bar is biased in the rotating direction in drawing out of the webbing, so as to be in press contact with the insertion hole, with being scraped out, thereby attaining a state where no rattling exists between them. Therefore, when the torsion bar starts twist deformation at the operation of the emergency locking mechanism, an impact load can be effectively absorbed without accompanying any time delay, and the durability is superior.

When the coupling portion of the ratchet wheel and the insertion hole of the torsion bar have a polygonal shape in which concaves and convexes are formed at a predetermined interval in the circumference direction, the faces of the coupling portion and the insertion hole abut against each other in biasing due to the rib-like projections, so that the press contact between them becomes stronger, whereby the above-mentioned effects can be more surely attained. Furthermore, if the configuration according to the invention of claim 2 in which rib-like projections are disposed in at least three positions at regular intervals in the circumference direction in the insertion hole of the ratchet wheel is adopted, the torsion bar is not locally biased in the insertion hole, but can be always biased in the fixed direction in the circumference direction. The occurrence of a combination error in the phase angular between them can be more surely prevented.

Moreover, if the configuration according to the invention of claim 4 in which a region where rib-like projections are not formed within a predetermined distance from an end portion of the torsion bar insertion side is disposed is adopted, when the coupling portion of the torsion bar is inserted into the insertion hole and they are mutually coupled, a gap is formed between them at the start of the insertion, so that smooth insertion can be realized. Thus, improvement of the combining workability can be attained.

What is claimed is:

1. A seat belt retractor in which said seat belt retractor comprises: a spool for winding a webbing; and an emergency locking mechanism including: a ratchet wheel which rotates together with said spool; and a pawl which meshes with said ratchet wheel in response to emergency detection by inertia sensing means, thereby setting said spool into a locked condition via said ratchet wheel, and a torsion bar is disposed between said spool and said ratchet wheel, one end of said torsion bar being coupled to said spool, another end of said torsion bar being coupled to said ratchet wheel, said torsion bar being subjected to twist deformation to absorb an impact when a force in a drawing direction acts on said webbing in an operating condition of said emergency locking mechanism, and characterized in that a coupling portion of said torsion bar with respect to said ratchet wheel is formed into a polygonal shape, a polygonal insertion hole into which said polygonal coupling portion is to be fitted is formed in said ratchet, and a rib-like projection is formed on an inner face of said polygonal insertion hole in an axial direction of said torsion bar, said rib-like projection biasing, when said webbing is drawn, said torsion bar in said insertion hole in a direction along which said torsion bar rotates, to cause respective faces to be in press contact with each other in the direction.

2. A seat belt retractor according to claim 1, wherein a shape of said coupling portion of said torsion bar with respect to said ratchet wheel is a polygon in which concaves and convexes are formed at a predetermined interval in a circumference direction.

3. A seat belt retractor according to claim 1, wherein said rib-like projection is formed in at least three positions on said inner face of said polygonal insertion hole at predetermined intervals in the circumference direction.

4. A seat belt retractor according to claim 1 or 2, wherein said rib-like projection is formed from a position which is distant away from an open end of said polygonal insertion hole on a torsion bar insertion side by a predetermined distance, to an inner side.

* * * * *